(12) United States Patent
Pettersen et al.

(10) Patent No.: US 10,751,872 B2
(45) Date of Patent: Aug. 25, 2020

(54) UNDERWATER MANIPULATOR ARM ROBOT

(71) Applicant: EELUME AS, Trondheim (NO)

(72) Inventors: Kristin Y. Pettersen, Trondheim (NO); Pål Liljebäck, Trondheim (NO); Asgeir J. Sørensen, Flatåsen (NO); Øyvind Stavdahl, Heimdal (NO); Fredrik Lund, Trondheim (NO); Aksel A. Transeth, Trondheim (NO); Jan Tommy Gravdahl, Trondheim (NO)

(73) Assignee: EELUME AS, Trondheim (NO)

( * ) Notice: Subject to any disclaimer, the term of this patent is extended or adjusted under 35 U.S.C. 154(b) by 148 days.

(21) Appl. No.: 15/546,820

(22) PCT Filed: Jan. 13, 2016

(86) PCT No.: PCT/EP2016/050569
§ 371 (c)(1),
(2) Date: Jul. 27, 2017

(87) PCT Pub. No.: WO2016/120071
PCT Pub. Date: Aug. 4, 2016

(65) Prior Publication Data
US 2018/0021945 A1 Jan. 25, 2018

(30) Foreign Application Priority Data
Jan. 29, 2015 (GB) .................................. 1501479.8

(51) Int. Cl.
*B25J 9/06* (2006.01)
*E21B 41/04* (2006.01)

(52) U.S. Cl.
CPC ............... *B25J 9/065* (2013.01); *E21B 41/04* (2013.01); *Y10S 901/44* (2013.01)

(58) Field of Classification Search
CPC .. B25J 9/06; B25J 9/065; E21B 41/04; B63H 1/36; B63H 1/37; Y10S 901/44
See application file for complete search history.

(56) References Cited

U.S. PATENT DOCUMENTS

2006/0070775 A1 * 4/2006 Anhalt .................... B08B 9/045
180/9.1
2009/0248202 A1 * 10/2009 Osuka .................. A61B 1/0055
700/245

(Continued)

FOREIGN PATENT DOCUMENTS

| CN | 1676419 A | 10/2005 |
| CN | 101412437 A | 4/2009 |

(Continued)

OTHER PUBLICATIONS

Crespi et al., "Salamandra robotica II: an amphibious robot to study salamander-like swimming and walking gaits," Apr. 2013, pp. 1-13, IEEE Transactions on Robotics, vol. 29, No. 2.

(Continued)

*Primary Examiner* — Spencer D Patton
(74) *Attorney, Agent, or Firm* — Heslin Rothenberg Farley & Mesiti P.C.; George Blasiak

(57) ABSTRACT

An underwater manipulator arm robot comprises: a plurality of links that are connected to one another by joint modules for generating a flexural motion of the robot; multiple thrust devices located at different points along the length of the robot for applying thrust to the robot for propulsion and/or guidance; and at least one tool, or at least one connection point for a tool, attached to the robot; wherein the flexural motion and/or thrust devices enable movement of the robot and control of the orientation and/or location of the tool.

26 Claims, 8 Drawing Sheets

(56) References Cited

U.S. PATENT DOCUMENTS

| | | | | |
|---|---|---|---|---|
| 2010/0317244 | A1* | 12/2010 | Jacobsen | ........... B63C 11/34 440/12.63 |
| 2013/0305978 | A1 | 11/2013 | Glezer et al. | |
| 2014/0213126 | A1 | 7/2014 | Item et al. | |
| 2015/0203183 | A1* | 7/2015 | Ambs | ........... G06F 16/951 60/495 |

FOREIGN PATENT DOCUMENTS

| | | |
|---|---|---|
| CN | 101746237 A | 6/2010 |
| CN | 20329319 U | 11/2013 |
| CN | 203779496 U | 8/2014 |
| JP | S63500856 A | 3/1988 |
| JP | H0259286 A | 2/1990 |
| JP | H0485197 A | 3/1992 |
| JP | H0989543 A | 4/1997 |
| JP | 2004521765 | 7/2004 |
| JP | 200805544 A | 8/2006 |
| RU | 135614 U1 | 12/2013 |
| WO | WO2009/009673 A2 | 1/2009 |
| WO | WO2010/144820 A3 | 12/2010 |
| WO | WO2013/157977 A1 | 10/2013 |

OTHER PUBLICATIONS

Patent Cooperation Treaty, Notification of Transmittal of the International Search Report and the Written Opinion of the International Searching Authority for PCT/EP 2016/050569 dated Mar. 30, 2016, 13 pages.

GB Intellectual Property Office, Search Report under Section 17(5) for GB1501479.8 dated Jul. 24, 2015, 4 pages.

Japanese Office Action for JP Application No. 2017-540553, dated Nov. 26, 2019. (Cited with the Original document and a Full Text Translation).

* cited by examiner

UNDERWATER MANIPULATOR ARM ROBOT

CROSS REFERENCE TO RELATED APPLICATIONS

This application is a national stage filing under section 371 of International Application No. PCT/EP2016/050569, filed on Jan. 13, 2016, published in English on Aug. 4, 2015 as WO2016/120071A1 which claims priority to GB Application No. 1501479.8, filed on Jan. 29, 2016, the entire disclosure of these applications being hereby incorporated herein by reference.

The present invention relates to an underwater manipulator arm robot with a tool, for example a submersible robot capable of transit, maneuvering and dynamically positioning (station keeping/hovering) itself and also providing capabilities for inspection, maintenance and repair (IMR).

BACKGROUND

Submersible robots are used for various purposes in the prior art. Autonomous and remotely controlled robots can take many forms and sizes and have been adapted for numerous purposes. Some known designs are used only for surveillance and monitoring, and are not able to interact directly with other objects, on a physical level. Such robots include so-called 'snake robots', which move with an eel-like or fish-like motion. Other known designs include gliders using buoyancy driven propulsion for mapping and monitoring, ROVs (remotely operated vehicles) and AUVs (autonomous underwater vehicles) with manipulators for physical interaction with other objects, such as robotic arms holding grasping mechanisms and other tools. The ROV or AUV must provide a stable base in order to support the arm, and hence such vehicles are relatively large and cumbersome. Gliders are limited in accuracy when it comes to guidance, navigation and control, and are only able to work effectively as they undulate downwards or upwards. This makes it difficult to use underwater manipulator robots when it is required to manipulate an object in a small space, or when the access to the working area is narrow.

BRIEF DESCRIPTION

Viewed from a first aspect, the invention provides an underwater manipulator arm robot comprising: a plurality of links that are connected to one another by joint modules for generating a flexural motion of the robot; multiple thrust devices located at different points along the length of the robot for applying thrust to the robot for propulsion and/or guidance; and a tool, or a connection point for a tool, attached to the robot; wherein the flexural motion and/or the thrust devices enable movement of the robot and control of the orientation and/or location of the tool.

A joint module is any mechanism allowing controlled relative rotation and/or translation between two elements (referred to as links) about a single axis or multiple axes of rotation. The links are either rigid or flexible elements, and typically provide the physical connections between the joint modules. The links and the joint modules may also hold other components or have other functions. For example they could include one or more thrust device(s) or connection points for tool(s). In some example embodiments some of the links include thrust modules as discussed further below, and the joint modules may be articulated mechanisms in between the links. The joint modules may include moving parts housed in a bellows, for example an oil filled bellows. The use of an oil filled bellows provides protection from water ingress as well as reducing the risk of snagging of the mechanical parts during use.

The use of the thrust devices for propulsion and/or guidance encompasses all desirable uses of thrust forces on the robot. This may include: rotational and/or translational motion of the entire robot or of parts of the robot; station keeping (e.g. 'hovering'), with the thrusters acting against gravity, buoyancy and/or or water currents; heading changes during on-going movement; changes to the configuration/shape of the robot; and/or propulsive forces used to assist or amplify flexural movements of the robot; amongst other things.

The tool may be any type of tool required for submerged operations, including all types of underwater mapping, monitoring and IMR tools, for example inspection tools such as a camera, or manipulator tools such as a gripper tool.

The robot of the first aspect effectively provides a manipulator arm without the encumbrance of an ROV or AUV holding the arm. The robot can manoeuvre itself to a target site, which can include travelling down pipes, risers, and through narrow spaces, carry out station keeping or hovering (also called dynamic positioning), and then it can use the tool to perform a required operation, with some or all of the links of the robot acting as links of a manipulator arm.

The flexural motion may be an articulated motion with rigid links rotating and/or translating relative to one another. It also may use flexible structures that can be moved into curved shapes. Typically a repeated flexing motion may be used if it is required to propel the robot using movement of the joints. The joint modules act to generate the flexural motion. Thus, the joint modules may actively drive movement of the links relative to one another and may be actuated by one or more actuators as mentioned below. The actuators may be contained within the links or held in between the links.

In some preferred examples, the flexural motion of the robot can be an undulating motion capable of propelling the robot. An example of a robot that can perform such a motion is an underwater snake robot. For centuries, engineers and scientists have gained inspiration from the natural world in their search for solutions to technical problems. This process is termed biomimetics. Underwater snake robots are one form of robot that has arisen from biomimetics. These types of robots have been proposed for use in underwater exploration, monitoring, surveillance and inspection. Also, for the ocean science community including oceanography, biology and marine archaeology, snake robots that are able to swim smoothly without much noise, and that can navigate in difficult environments such as ship wrecks and other confined environments, are very interesting. However, snake robots and similar robots have not before been proposed for use as a manipulator arm as described herein.

The manipulator arm robot may be a snake robot. In the current context a snake robot is any type of multi-linked robot designed to flex at two or more joints, typically at a large number of joints, to thereby generate an undulating motion similar to the motion of a snake or an eel. All of the robot may be flexible, or the robot may have flexible sections and rigid/fixed sections. A combination of flexible and fixed sections can also be achieved by fixing/'freezing' the joint modules along part of the length of a fully flexible robot. Such multi-linked robots may alternatively be designated as eel robots or lamprey robots and the term "snake robot" is intended to cover this.

The robot may alternatively take the form of a fish robot. Fish robots typically have fewer links and do not have an elongate body structure, which is a feature of a snake robot. The snake robot may be differentiated from fish robots by reference to its elongate shape, for example the snake robot may have a length that is at least five times its maximum or its average width, preferably a length that is at least ten times its maximum or its average width. It is currently thought that a snake robot may provide additional advantages due to its greater length and range of movement, but a fish robot with the features of the first aspect would also provide improvements compared to known underwater robots.

The underwater robot should also be distinguished from ground based snake robots. Ground based snake robots are considerably different since they rely on friction between the robot and the ground, often using free-rolling wheels to prevent sideways slipping and/or to reduce longitudinal friction, in order to move the robot with an undulating motion. In contrast, underwater robots can move sideways and can push against the surrounding fluid with movement of the body and they do not rely on interaction with a solid surface using friction.

The robot comprises multiple thrust devices mounted at multiple different points along the robot's length. The thrust devices may include a thrust device for applying lateral and/or vertical thrust, i.e. thrust in a direction extending across the length of the robot. The thrust devices may alternatively or additionally include a thrust device for applying longitudinal thrust, i.e. thrust in a direction extending along the length of the robot. The thrust devices may be mounted in any required angular orientation. They may be mounted to provide thrust along a line that intersects with a longitudinal axis of the robot, or they may be mounted spaced apart from the longitudinal axis of the robot with a direction of thrust that does not intersect with the longitudinal axis of the robot (at least when the robot is in a straight configuration). Thrust devices located in this way can be used to apply a torque to the robot, including torque in yaw, pitch or roll depending on the position and orientation of the thruster.

The thrust devices may include propellers, impellers, tunnel thrusters, rotatable (azimuth) thrusters, retractable thrusters, screws (single, twin, contra rotating, controllable-pitch, nozzle style etc.), fins, vacuum pumps or thrusters and/or water jets. The thrust devices may provide thrust with a controllable direction and magnitude of thrust. In some examples one or more directionally controllable thrust device(s) may be capable of being oriented to provide longitudinal thrust or lateral thrust. In addition, control surfaces like rudders and fins, guide vanes and/or the relative rotation between the links can contribute to direction control. This can be whilst the robot is being propelled by a thrust device and/or in the situation where the robot is being towed.

The robot can also be equipped with wings or fins for producing lift and/or it can have a body shape that can produce lift. Thus, in some examples the robot includes one or more steerable fins. Such fins or control surfaces may be used in order to avoid or suppress random disturbances from ocean currents, unmodelled cable buoyancy and so on. Thrust device(s) may be used for the same purpose, instead of or in conjunction with the steerable fins.

The thrust device(s) may advantageously allow the robot to keep a constant position and/or orientation in the water, even during movement of the articulated links (which may be an undulating movement). Thus the thrust device(s) may be arranged to provide thrust to give a hovering type capability to the robot.

An example of a thrust device for applying lateral thrust is a thrust module with one or more thrusters, the thrust module being integrated with a joint module and/or a link or being mounted fore or aft of a joint module and/or a link. Such a thrust module may, for example, include tunnel thrusters using propellers, or water jet thrusters. One example uses a thrust module with thrusters oriented in two perpendicular directions, which may be two directions that are generally orthogonal to the longitudinal extent of the robot (or to a tangent to the extent of the robot when it is in a curved shape). This allows thrust to be applied in any lateral direction, such as an up-and-down direction, or a side-ways direction. Alternatively, or in addition there may be one or more thrust modules with a thruster that can be rotated about the axis of the robot to thereby apply thrust in all lateral directions. Rotation of such a thruster may be achieved by movement of the thruster relative to the thrust module, or rotation of the thrust module relative to adjacent joint modules. There may be multiple thrust modules along the length of the robot. This allows thrust to be applied to different parts of the robot in different directions, which means that all kinds of movements can be achieved, such as a translation movement of the robot, or a rotation in roll, pitch or yaw without translation, or combinations of these movements. Lateral thrust forces can also be used to urge joint modules into new positions/angles, for example in order to aid a shift to a new shape/configuration of the robot. This could be done to increase the speed of transition, or to provide movement between links in the event that a joint module has a fault.

An example of a thrust device for applying longitudinal thrust is a stern thrust device mounted at the stern of the robot for applying a thrust at the end of the robot. Longitudinal thrust devices could alternatively or additionally be mounted at any point along the robot or at the front of the robot, and this has the advantage of leaving the stern of the robot free for mounting a tool. This thrust device could be protruding at a constant angle to the snake body, or its direction could be changed and it could also be retractable. A stern mounted device enables the thruster to be in-line with the length of the robot, rather than resulting in a protrusion from the robot at one side, which might otherwise be required to allow thrust in a longitudinal direction. The thruster for applying longitudinal thrust can be any suitable thruster, such as a propeller or a water jet thruster. A thrust device capable of providing lateral thrust may be used to adjust the vertical position of the robot and/or to adjust its orientation in a vertical plane by applying thrust away from the centre-of-mass of the robot. However, in the likely event that the robot is not perfectly neutrally buoyant, then continual thrust will be required in order to maintain a constant vertical position and/or orientation. This can be a disadvantage in relation to power usage and thus it is desirable to avoid this, especially where the robot is battery powered.

To address this issue, the robot may optionally be provided with elements having controllable buoyancy. For example, the robot may include ballast tanks that can be filled with pressurised air or alternatively any "bladder" or fluid that can be compressed or expanded to change its buoyancy or weight. An element with controllable buoyancy can provide the forces necessary to maintain a constant vertical position without requiring energy consumption except during inflation or deflation. In addition, as the robot has links and joint modules allowing for flexing and changes in shape/configuration, then it is possible to use the joints to change the relative position between the buoyancy elements and thereby manipulate the centre of buoyancy of the robot. Movement via the joint modules may hence be used to manipulate how the buoyancy elements affect the motion of the robot.

A preferred implementation may include both thrust devices for vertical thrust and also one or more elements with controllable buoyancy. The thrust devices and controlled-buoyancy elements may be incorporated in a single module, such that a thrust module as described above may also have a controlled-buoyancy capability. Advantageously, the buoyancy or weight can be used to provide a slowly varying vertical force to compensate for the weight of the robot and/or for constant vertical currents, whereas the thrust device(s) can provide a rapid corrective force to compensate for rapid changes in forces affecting the robot, for example sudden shifts in currents, or changes arising from changes in shape of the robot. This arrangement can make effective use of the more energy efficient buoyancy elements, whilst also allowing accurate and rapid control of the robot's position and orientation. In one preferred example the buoyancy of the controllable-buoyancy elements may be controlled locally as the time integral (i.e. an integral controller) of the vertical component of the local thruster control inputs, so that the average vertical thrust converges to zero under stationary conditions. Thus, the high-frequency vertical forces are provided by thrusters, while the low-frequency component is provided by the buoyancy elements.

In preferred examples the robot comprises at least three links joined by joint modules allowing for articulated motion. The links can take any suitable form, and in particular they may be thrust modules, rigid links with guide fins, or rigid coupling links with no thrust or guidance function. There may be at least ten links, for example, so that the robot takes the form of a snake robot. A typical snake type robot may have between three and twenty joint modules joined end-to-end, each joint providing one or more degrees of freedom.

The joint modules may permit relative rotation in a single plane to provide a two dimensional movement. Alternatively the joints may permit a higher dimensional movement, for example allowing for undulations both horizontally and vertically. The joint modules each permit relative rotation in one or more of the yaw, pitch and roll directions of the robot, optionally rotation in all three of yaw, pitch and roll. The relative rotation enables control of the orientation and/or position of the tool. The joint modules may include one or more actuators for driving articulated motion, for example electric, pneumatic, and/or hydraulic actuators. The joint modules may also allow for translational movements of the links at either side of the joint.

The tool or connection point may be attached at any convenient point on the robot and as noted above it may be any type of tool, including inspection tools, manipulator tools, and other types of IMR tools. Thus, the tool or connection point may be at the front end of the robot, at a front module; it may be at a mid-point, integrated with one of the rigid links at a mid-length of the robot for example; or it may be at the stern end of the robot. There may be multiple tools or connection points, for example there may be a tool or connection point at the front end of the robot as well as a tool or connection point at the stern end of the robot. One example includes a tool or connection point at the front end and at the stern end, as well as another tool or connection point at a mid-point of the length of the robot. Multiple tool arrangements like this may be used to allow for a manipulation tool at one end of the robot and an inspection tool at another end of the robot, thereby enabling the robot to monitor operation of the manipulation tool using the inspection tool, which may be a camera for example. There may be tools at both ends of the robot with an inspection tool mounted at a midpoint. The tools at both ends may both be manipulation tools. This can allow for complicated "two-handed" operations using the tools at both ends whilst monitoring the operations using the inspection tool at the midpoint. A further option is to include inspection tools with the manipulation tools, such as a camera mounted in the same module as a gripper. Where a connection point is present there may be a tool mounted to it in releasable fashion, preferably using a standardised coupling type. Advantageously the connection point can be arranged for connection of alternative types of tools, which can hence allow a single robot to be fitted with different tools for different subsea operations.

In some preferred examples the robot has a tool or a connection point for a tool at a front module, so that the tool is located at the front end of the robot. A tool mounted at the front end can have a large range of movement, especially when combined with a longitudinal thrust device such as a stern thrust device and one or more thrust modules for lateral thrust.

With the above in mind, it will be appreciated that one example embodiment of the robot may comprise a snake robot having a front module with a tool or a connection point for a tool, a thrust device for producing a longitudinal thrust, which may be a stern thrust device at the opposite end of the robot to the front module, multiple links between the front end and stern end, the links coupled by joint modules, and one or more thrust modules along the length of the robot for producing lateral thrust. Such a snake robot is capable of a large range of movements and can perform a wide range of differing types of subsea operations.

Another example omits the stern thrust device and may also omit longitudinal thrust capabilities to focus on increased maneuverability and to perform more complex operations. Such an example may comprise a snake robot having a front module with a tool or a connection point for a tool, a stern module with a further tool or connection point for a tool, multiple links between the front end and stern end, the links coupled by joint modules for generating flexural motion, multiple thrust modules along the length of the robot for producing lateral thrust; and an inspection tool mounted at a midpoint of the length of the robot.

The undulating motion of the snake robot can be characterised as a sinusoidal type motion. This may, for example, be a lateral undulation or an eel like motion. This type of motion is different to the motion of multi-link fish robots. In example embodiments the motion of the snake robot is generated by making each joint i of the underwater snake robot with n joint modules track a sinusoidal reference signal:

$$\Phi_i^*(t) = \alpha g(i,n)\sin(\omega t + (i-1)\delta) + \gamma,$$

where $\alpha$ and $\omega$ are the maximum amplitude and the frequency, respectively, $\delta$ determines the phase shift between the joints, while the function $g(i, n)$ is a scaling function for the amplitude of joint i which allows to describe a quite general class of sinusoidal functions, including several different snake motion patterns. The parameter $\gamma$ is a joint offset coordinate that can be used to control the direction of the locomotion of the snake robot. Preferably the parameters $\alpha$ and $\delta$ are fixed and the parameters $\omega$ and $\gamma$ are varied in order to control the speed and direction, respectively, of the snake robot. The above equation can be employed separately for each set of joints that have, for a straight robot, parallel axes of rotation. Hence, a separate set of parameters in the above equation can be used for the joints that control, e.g., yaw motion and pitch motion, respectively.

The robot may include a gait pattern controller for generating the undulating motion of the robot. The preferred robot may include an orientation control device for adjusting the orientation to the desired orientation. Thus could for example be a heading control device for adjusting the heading to follow the desired orientation. This device would hence provide adjustments in the yaw direction. The robot may alternatively or additionally include a pitch control device for allowing ascent and descent during the forward movement. The heading and/or pitch control devices may act during undulating motion, during thrust driven motion, or with both undulations and thrusters exciting motion of the robot. The heading and/or pitch control devices may be able to control the thrusters, in particular the thrust modules, in order to thereby control heading and/or pitch during forward motion. Alternatively or additionally the joint modules can be used to change the shape of the robot and thereby provide guidance to the direction of the thruster forces, as well as guiding motion of the robot via its shape when it is already moving.

The robot may have a tool controller for controlling motion of the tool, which may hence be a controller for controlling the orientation and location of the part of the robot where the tool is mounted, for example the front module.

The various controllers may be separate control modules formed as separate hardware, or separate software in common hardware, or there may be an integrated system which handles all aspects of control of the robot.

The robot may be provided with an attachment device for attaching the robot to another structure, for example to secure the robot in place on the another structure. This could be done by any suitable device, such as a mechanical clamp, a magnetic device or a suction device. One particular example uses a suction device that also provides a thrust device function. Such a device can in one mode of use generate a lowered water pressure between itself and a fixed structure to thereby provide suction to secure the robot to the structure, and in another mode of use it can provide thrust by propelling water outward from one side and drawing water inward on the other side, as would be done by the lateral thrust devices of the examples. A combined suction and thrust device may be provided by the addition of a suitable cowling or vane structure to a thrust module.

The use of combined suction and thrust device for an underwater vehicle is considered novel and inventive in its own right and hence in a further aspect the invention provides an underwater vehicle comprising a combined suction and thrust device, wherein the combined suction and thrust device uses the same driving mechanism to provide both of a first mode of operation where thrust is provided for propulsion and/or guidance of the vehicle and a second mode of operation where suction is provided for holding the vehicle against another structure.

This underwater vehicle may be a robot such as a snake robot and/or a manipulator arm robot. The robot may have any or all features as discussed above. The combined suction and thrust device may be a part of a thrust module as discussed above, and it may include any or all features of the thrust device/thrust module as discussed above.

The invention further provides a method for control of an underwater manipulator arm robot as described above, the method comprising: controlling the joint modules and the thrust devices in order to move the robot tool(s) into a required orientation and/or location; wherein the joint modules are used to generate a flexural motion that can propel the robot and/or used to adjust the shape and configuration of the robot; and wherein the thrust devices are used to move the robot in translation and/or in rotation.

Optionally, the joint modules may be used to adjust the shape and configuration of the robot in order to control the direction of the thrust device forces, and/or to generate a flexural motion that can propel the robot, and/or to move the robot tool(s) to the desired location and/or orientation.

The robot of this method may have any of the features discussed above. The controlling step can advantageously combine the flexural motion (which may be an undulating motion as discussed above) with thrust from the thrust devices in order to provide motion that is not possible with a conventional snake robot or a conventional ROV/AUV.

The method may include using the joint modules to move the robot into a required configuration and then using the thrust devices to translate and/or rotate the robot in the required configuration to move it to a required location. For example the robot may be placed by the joint modules into a certain shape, such as a U-shape, for a given task, and then moved by the thrust devices to a location relating to the task.

The underwater manipulator arm robot may include a thrust device for providing longitudinal thrust. In this case the method may include using the longitudinal thrust to propel the robot and using the joint modules to adjust the shape of the robot and thereby control the heading of the robot.

The relative location of the joint modules and thrust devices is known and/or can be calculated, and in addition the joint angles are known and/or can be calculated. The method of controlling the robot may include determining the orientation of all of the joint modules and thrust devices, determining a vector for thrust from each thrust device relative to the centre of mass of the robot and thereby determining required thrust forces and/or joint module adjustments to achieve a required change in orientation and/or location of the robot. For example, if a rotation of the robot with or without translation is required then the method may determine if there is a combination of thrust forces from the thrust devices that will provide a rotation force acting around the centre of mass along with a suitable force on the centre of mass. The force on the centre of mass may be zero in the case of no translation being required, i.e. such that the summation of forces from all the thrust devices about the centre of mass results in a moment with no translational forces. If such a combination of forces exists then the method may include controlling the thrust devices accordingly. If no combination of forces can be found then the method may include determining a movement of a controllable direction thrust device (if present) and/or a movement of one or more joint modules in order to provide a temporary new configuration for the robot that allows the thrust devices to provide forces in a manner that can achieve the required rotation and translation.

The method may include using computer software for determining the required movement of the joint modules and the required thrust from the thrust devices. Viewed from a further aspect the invention provides a computer programme product comprising instructions that when executed on a data processing device will configure the data processing device to control an underwater manipulator arm robot as described above by means of a method as described above. Thus, the computer programme product may configure the data processing device to control the joint modules and the thrust devices in order to move the robot into a required orientation and/or location; with the joint modules being used to generate a flexural motion that can propel the robot and/or being used to adjust the shape and configuration of the robot; and the thrust devices being used to move the robot in translation and/or in rotation. The computer programme product may optionally configure the data processing apparatus to perform the other method steps discussed above in relation to the method of the invention.

BRIEF DESCRIPTION OF DRAWINGS

Certain preferred embodiments of the invention will now be described by way of example only and with reference to the accompanying drawings in which.

DETAILED DESCRIPTION

As shown in the Figures, a proposed swimming snake robot incorporating one or more thrust devices can have increased functionality. A swimming snake robot, whose articulated structure is made up of serially connected joint modules, can be combined with thruster modules to improve the motion capabilities of the robot. Known snake robots consisting only of joint modules can swim like a biological eel. When the robot is curled around pipes and other structures or is within narrow locations of subsea installations, however, the motion capabilities of the robot will generally be reduced since the undulation motion required to propel the robot in a desired direction will be constrained by the surrounding subsea installation structure. By combining the articulated structure of the robot with thrusters that can induce linear forces on the robot along its body, the motion capabilities of the robot in narrow locations are significantly improved. In addition, the use of a stern propeller module as one of the thrust devices allows for faster linear motion of the snake robot.

An articulated robot with thrusters will essentially be an articulated ROV (remotely operated vehicle) when the robot is tethered or an articulated AUV (autonomous underwater vehicle) when there is no external tether. ROVs and AUVs are commonly used tools for subsea operations today. However, the known ROVs and AUVs are stiff structures consisting of a large main body equipped with one or several smaller manipulator arms. The concept described herein eliminates the large main body of the ROV/AUV and enables the manipulator arm itself to carry out both propulsion and manipulation, since the snake robot body effectively becomes the manipulator arm.

Figure 1:
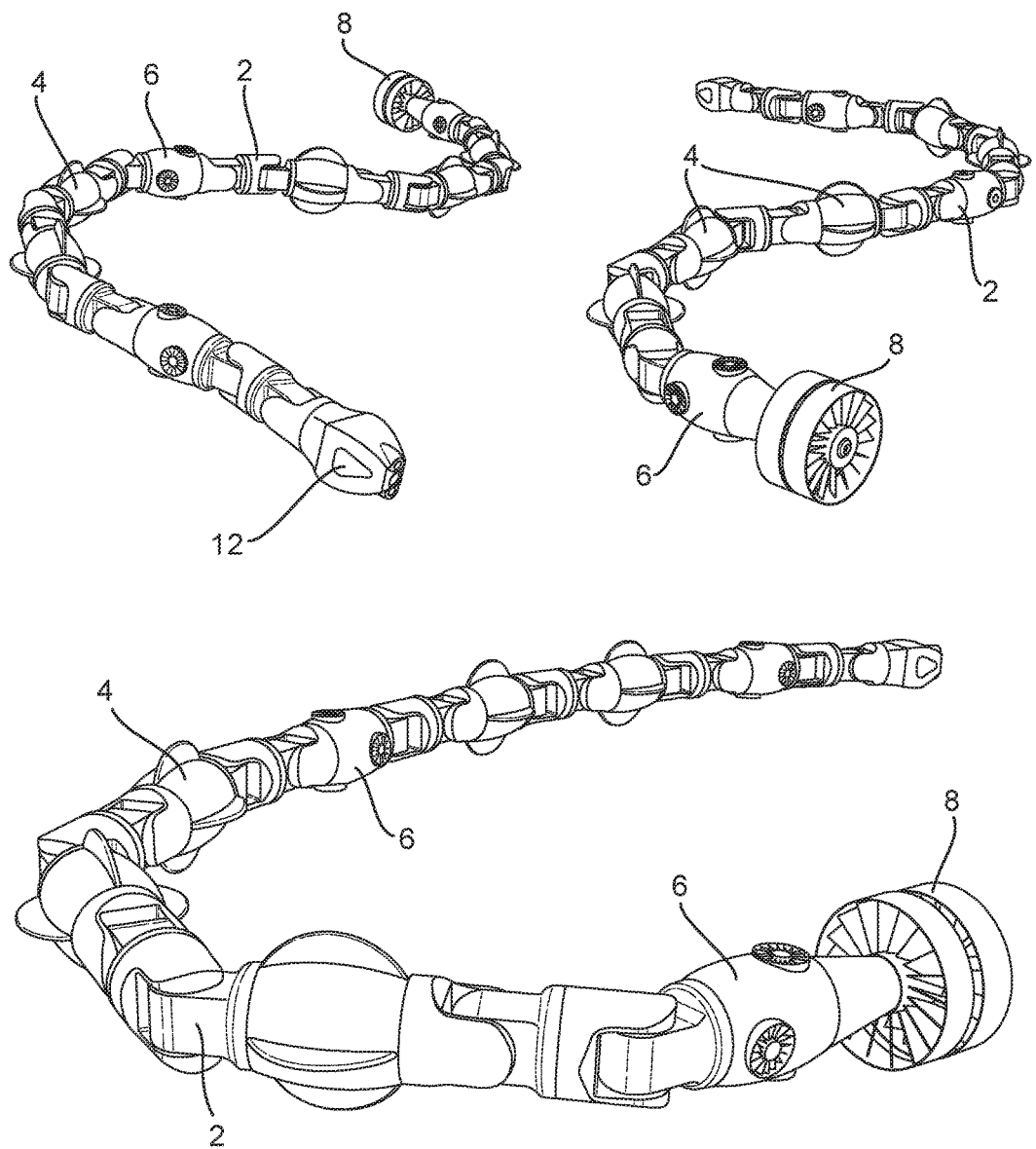
FIG. 1 shows several views of a snake robot with joint modules, fins and thruster modules.

The main features can easily be seen in FIG. 1, which shows three different views of a snake robot with joint modules 2, fins 4 and thruster modules 6. The exemplified thruster modules 6, which are located at various points along the length of the snake robot, are based on propellers and take the form of tunnel thrusters 6. Other types of thrusters could also be used, such as water jets. In addition, a further thrust device is present in the form of a stern thrust device 8, which in this example is a stern propeller module 8. Again, this could be substituted by other types of thruster(s). The stern thrust device 8 enables linear motion of the robot when the snake robot joints are aligned, as well as giving additional capabilities for maneuvering and applying force with the snake robot joints in a curved configuration.

The front module 10 of the robot can have a tool attached. The front module 10 is hence arranged for attachment of one or more tools, and different types of tools may be provided on different designs of snake robot. Alternatively, there may be an attachment point on the front module 10 arranged for attachment to a corresponding attachment point on several different types of tools, thereby allowing a single snake robot to be used for multiple purposes by selecting and attaching the required tool. For example, there may be an inspection tool 12 such as a camera or other sensor as in FIG. 1 and FIG. 3. Alternatively, there may be a manipulation tool 14, as shown in FIG. 4.

Figure 2:
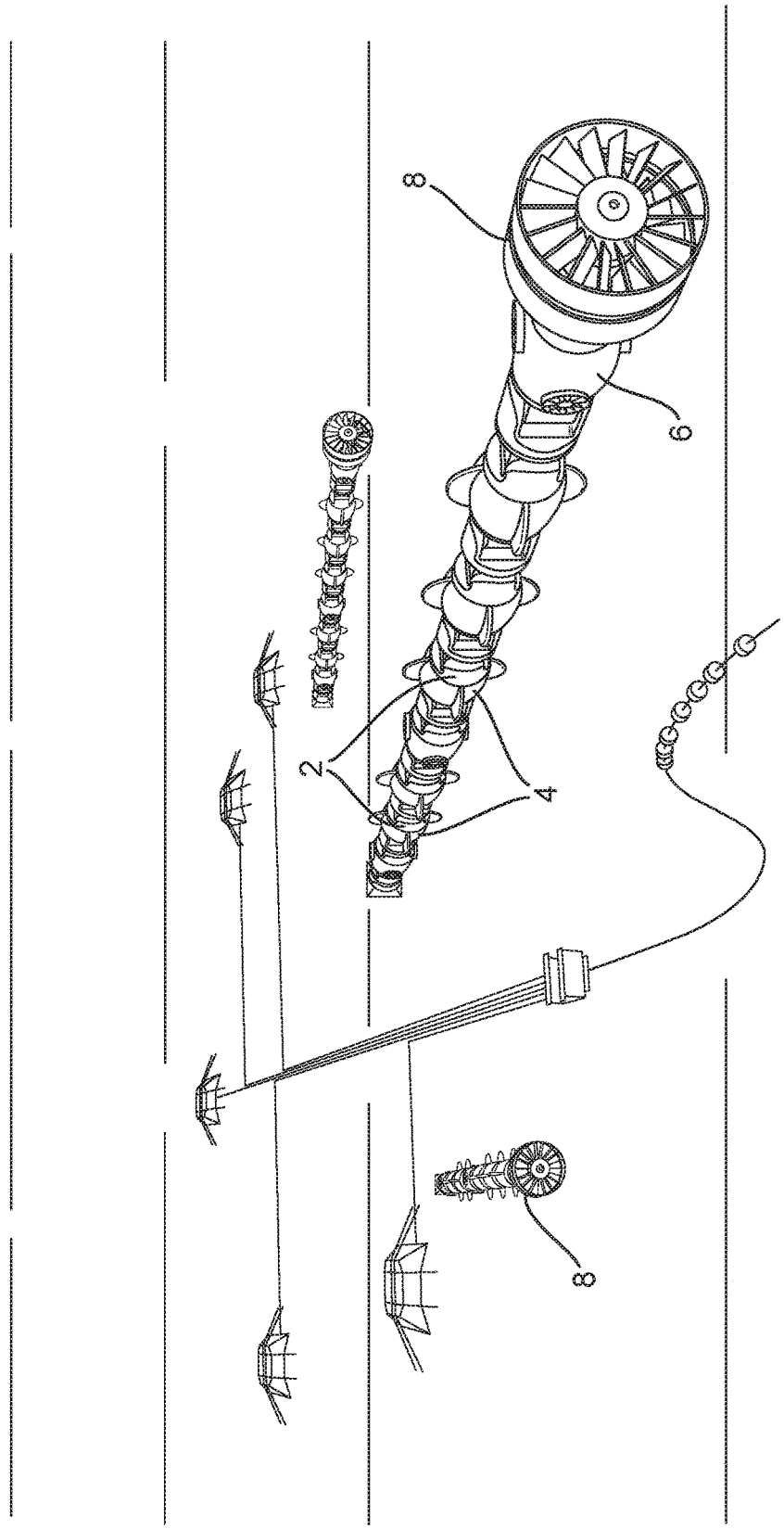
FIG. 2 illustrates a group of snake robots propelling toward a subsea installation by use of stern propeller modules.

FIG. 2 shows the use of the stern thrust device 8 to propel snake robots linearly toward a subsea installation. The robots can use their articulated structure (i.e. the joint modules 2) to swim like an underwater eel and/or for directional control, acting as a rudder or guide vanes in conjunction with thrust applied by the stern thrust device 8 and/or the thruster modules 6. The fins 4 assist in guiding movement of the robot. For motion over large distances it is considered to be most energy efficient to make the body of the robot straight like a torpedo and move through the water by running the thruster unit 8 in the back of the robot. The thruster modules 6 and/or the articulated structure can be used for directional control. The snake robot with thrusters hence has the same abilities as a traditional snake robot in relation to movement, as well as also having additional abilities for efficient long distance travel, a greater range of travelling speeds, as well as more control over the shape and attitude of the robot.

Figure 3:
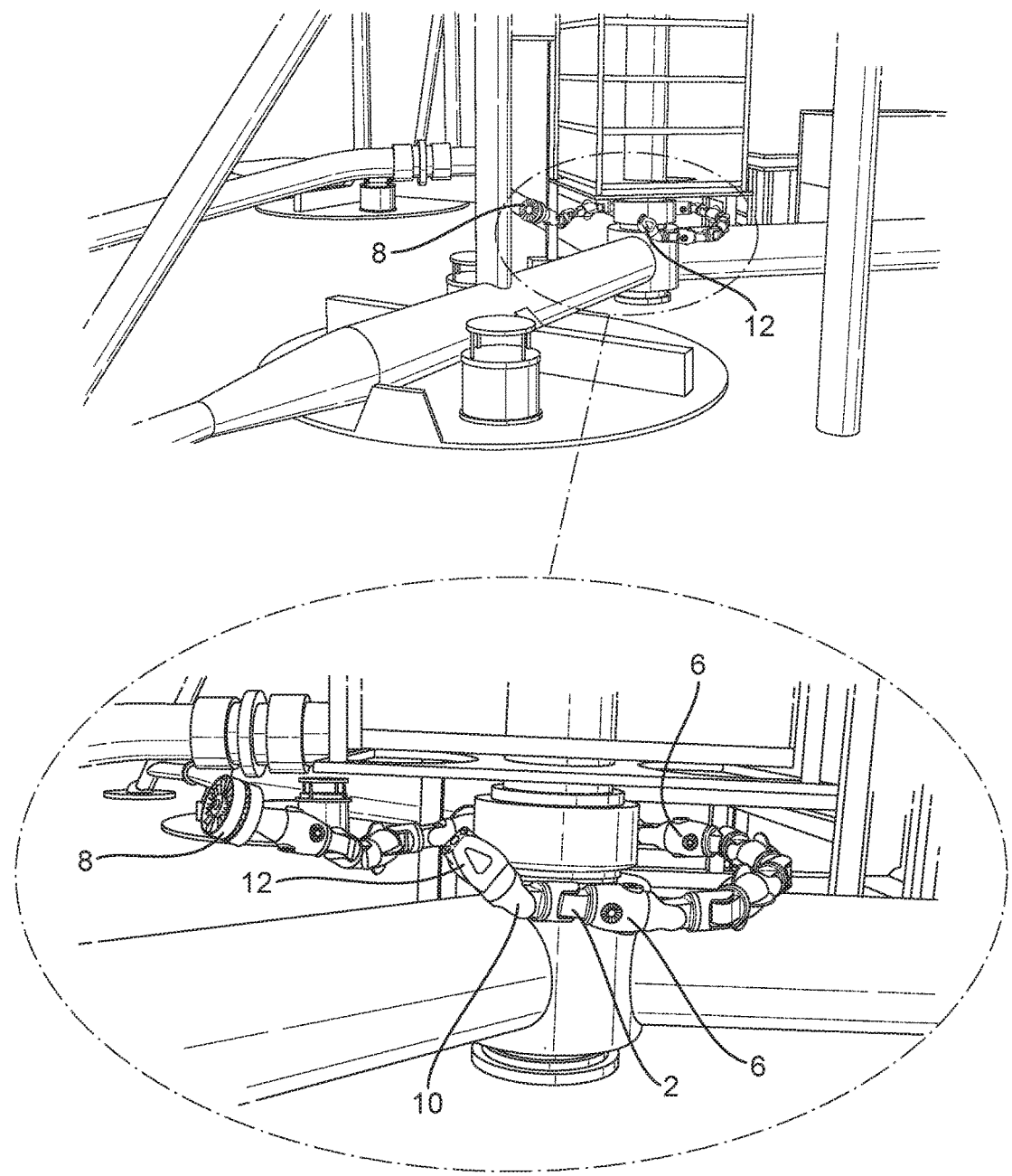
FIG. 3 shows a snake robot wrapped around a structure on a subsea installation in order to carry out an inspection task.
Figure 4:
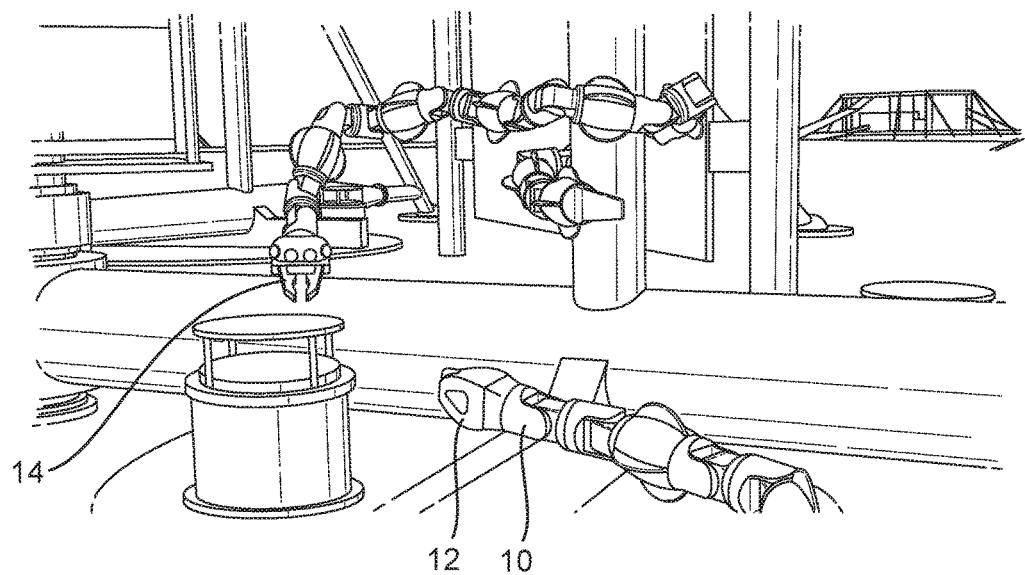
FIG. 4 shows a swimming snake robot with a gripper tool carrying out a manipulation task on a subsea installation.

One additional capability of the proposed snake robot is illustrated in FIG. 3. The snake robot has one end wrapped around a structure on a subsea installation in order to carry out an inspection task using an inspection tool 12 on the front module 10 of the robot. The tunnel thrusters 6 along the body increase the mobility of the robot and allow it to carry out linear displacements in all directions even though one end of the body is curled around a structure. This is not possible with a traditional snake robot. The stern thrust device 8 also provides additional movement capabilities.

FIGS. 5 to 8 show further examples in which the stern thrust device 8 is omitted and instead the snake robot has multiple tools at both ends, which in these examples are a manipulation tool 14 and cameras/sensors 16. Thus, the snake robot may be 'double ended' with a tool 14 at the front module 10 and at the stern of the robot, and a sequence of links with joint modules 2 and thruster modules 6 extending in between the two ends of the snake robot. In addition to the pair of manipulation tools 14 there is also an inspection tool 12 in the form of a camera 12 at the mid-point of the robot's length. This allows the operation of the two manipulation tools 14 to be monitored when the robot takes a suitable configuration, as in FIG. 5 and FIG. 7 for example. In this configuration the joint modules 2 at the central parts of the robot can be held rigidly, preventing movement, with the thrust modules 6 being used to counteract drifting movement from ocean currents. The joint modules 2 at the ends of the robot can be used to direct movement of the manipulation tools 14.

The snake robots of FIGS. 5 to 8 have no longitudinal thrusters. If these snake robots are required to move over large distances then it may be towed. To enable easy towed transportation the snake robot can assume a transport configuration similar to that of the snake robots with stern thrusters discussed above, i.e. a straight torpedo shape as in FIG. 6. The snake robot could alternatively or additionally be provided with longitudinal thrusters mounted at any point along the length of the robot. These could protrude outward from the thrust modules 6, or the thrust modules 6 could be provided with thrust directors such as vanes or nozzles for redirecting the thrust along the longitudinal direction of the robot. The example of FIGS. 9 and 10, described below, includes longitudinal thrusters at a mid-point of the robot, and t will be appreciated that similar thrusters could be utilised in any of the other examples.

Figure 5:
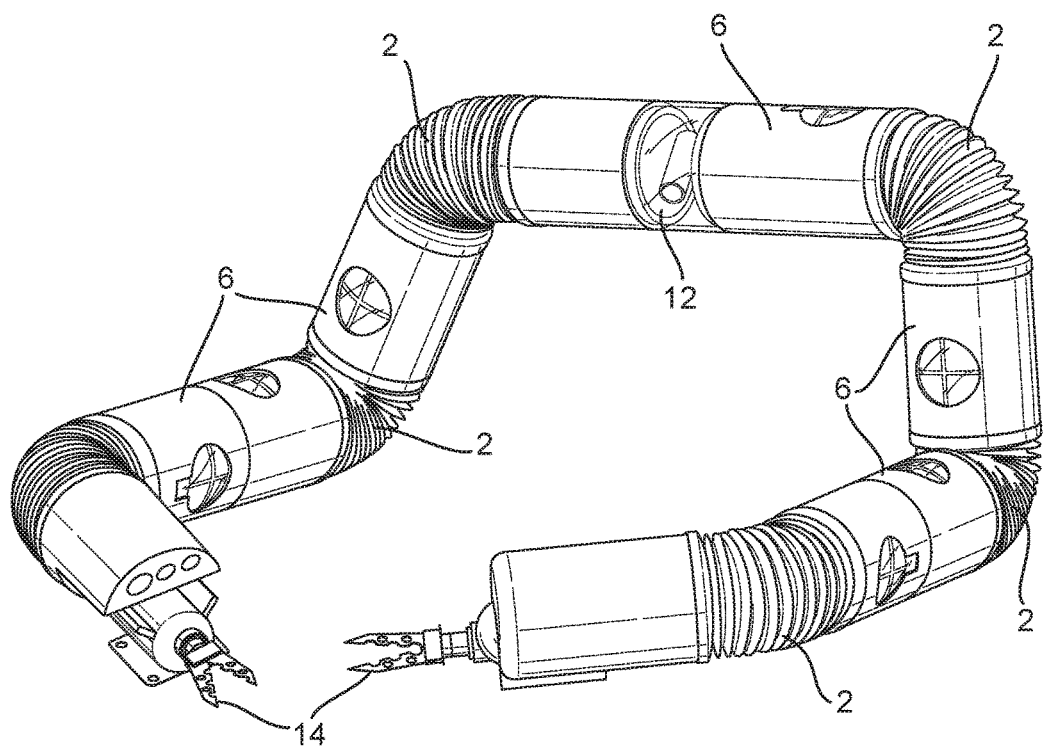
FIG. 5 shows a snake robot with tools at both the front end and the rear end, the snake robot being in a manipulation configuration.
Figure 6:
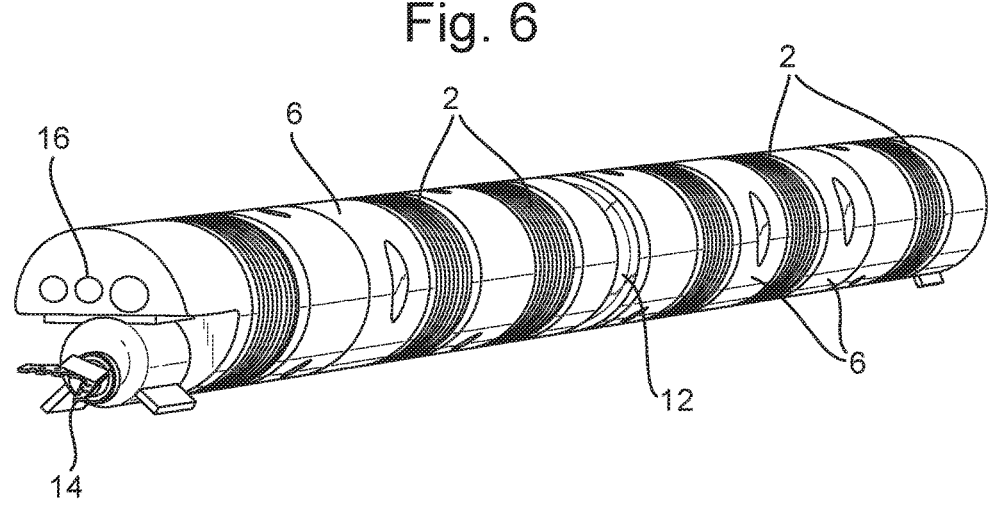
FIG. 6 shows the snake robot of FIG. 5 in a transport configuration.
Figure 7:
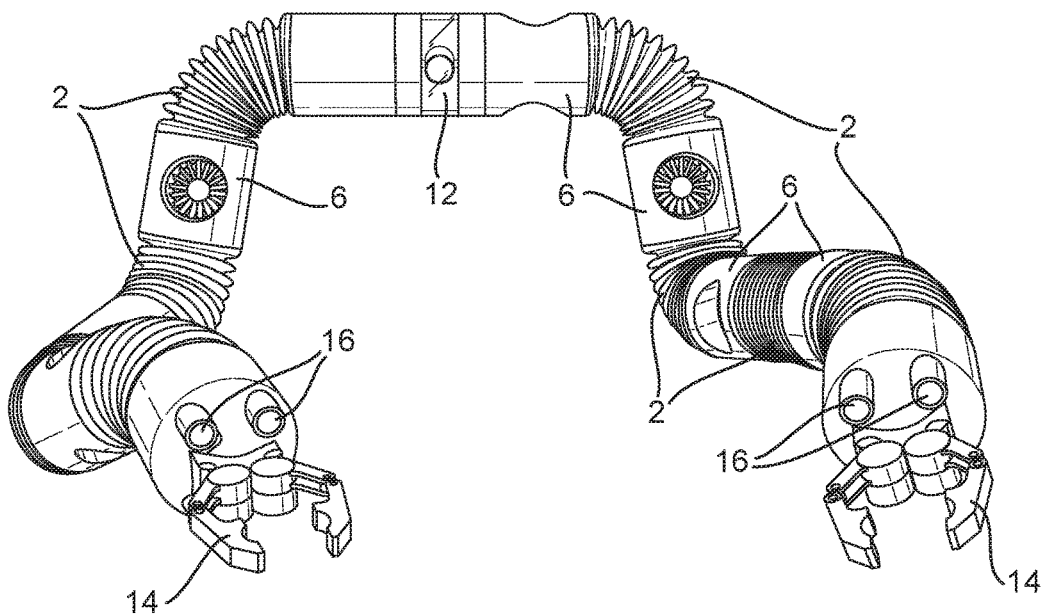
FIGS. 7 and 8 show two configurations of another snake robot with tools at both the front and the rear end.

In the robot of FIGS. 5 and 6 the robot is equipped with sensors 16 at the front and rear modules. The sensors 16 may be cameras, for example. These can provide information during transportation, and also provide further information relating to operation of the manipulation tools 14, such as a close-up view.

Figure 8:
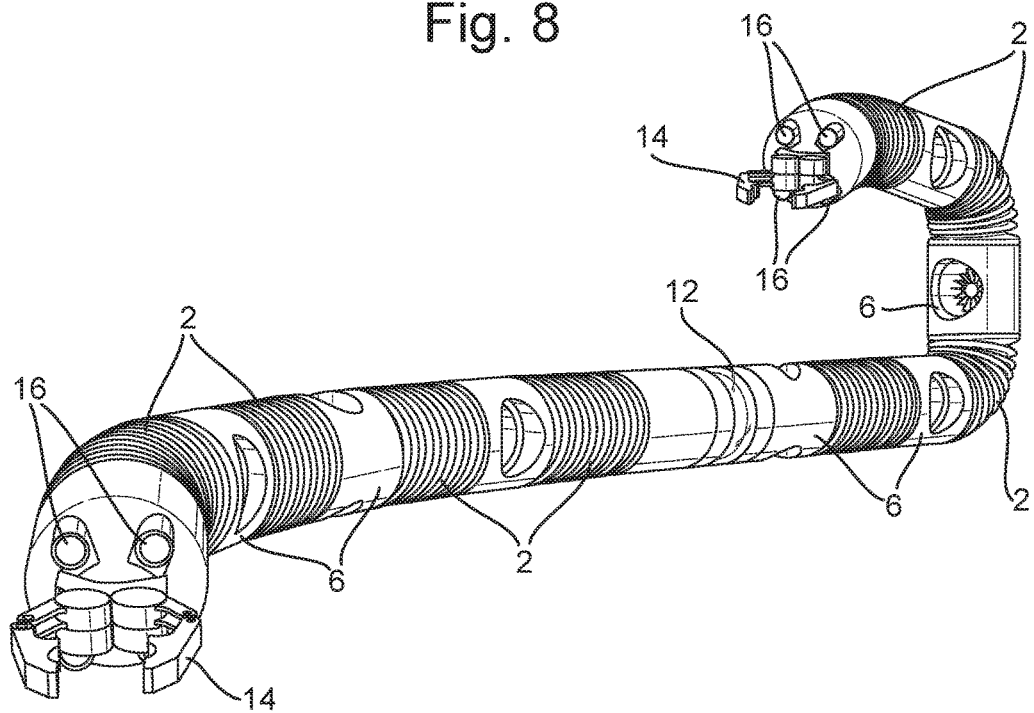

By way of example, FIG. 8 shows a further configuration for the snake robots. With this configuration one of the thrust modules is oriented to provide thrust along the longitudinal direction of the major part of the robot. This can provide more flexibility when the robot is required to maintain a position relative to a fixed structure, for example so that one of the manipulation tools 14 can work on a part of the fixed structure. It will be understood that the robot has a very high degree of freedom and hence can assume any position that is achievable through rotation of the joint modules 6, bearing in mind that they can potentially rotate in all of the pitch, yaw and roll directions.

Figure 9:
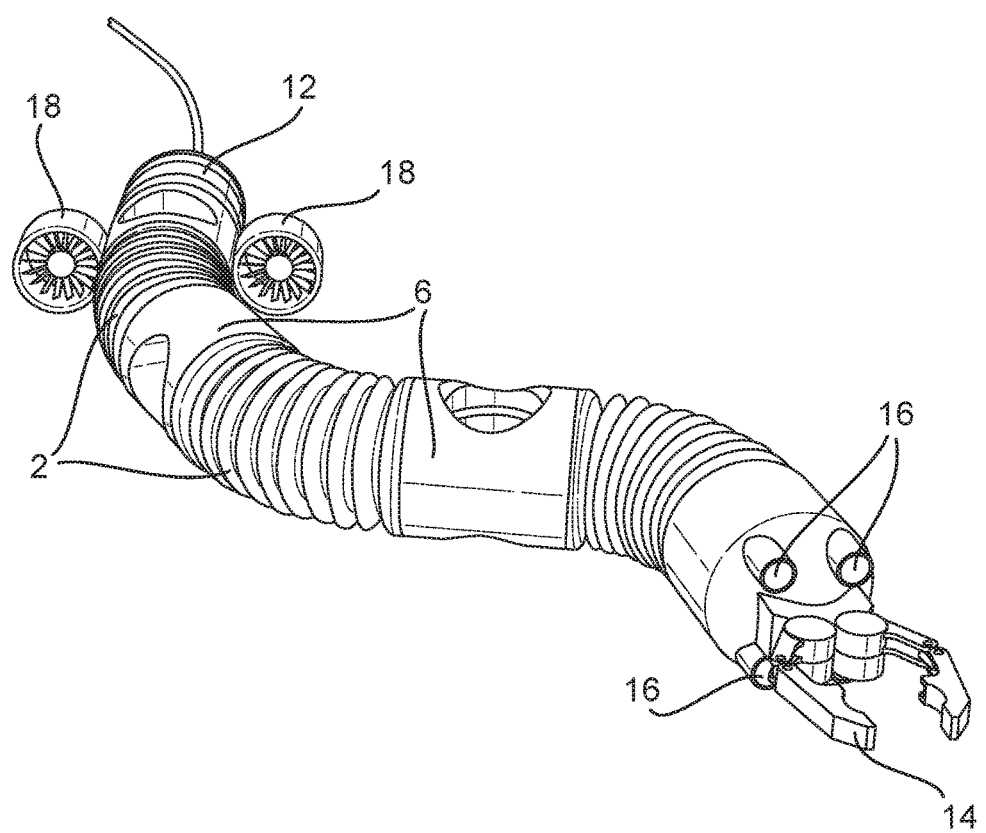
FIGS. 9 and 10 show a further example where the snake robot has longitudinal thrusters at a mid-point of the robot and tools at both ends.
Figure 10:
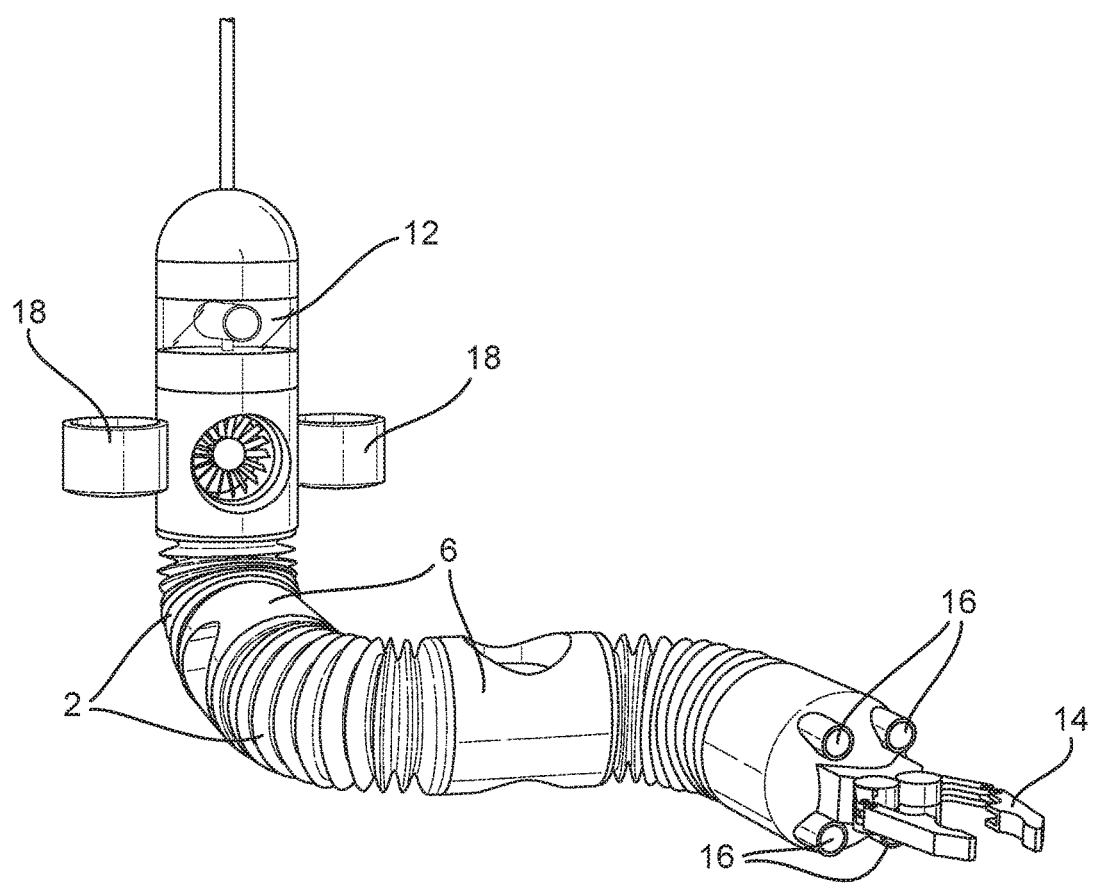

In another example, as shown in FIGS. 9 and 10, the robot has a manipulator tool 14 at the front module, along with sensors/cameras 16, with an inspection tool 12 at the stern. Thrust modules 6 and joint modules 2 are used to allow the robot to generate an undulating motion and to assume various configurations as with the other examples. To allow for propulsion in translation via longitudinal thrust this example has side-mounted longitudinal thrusters 18 at a mid-point of the robot. Such side-mounted thrusters 18 can provide longitudinal thrust in the same way as the previously discussed stern thruster 8.

It will be appreciated that the snake robot is in itself a manipulator arm and hence can perform similar tasks to those performed by a manipulator arm mounted on a prior art ROV or AUV, but without the bulk of the ROV or AUV. The robot can be used to carry out manipulation tasks by mounting a manipulation tool 14 somewhere on the robot, for example a gripper tool 14 at the front module 10 and/or at the stern as in FIGS. 4 to 10. It will be seen that the combination of features in the proposed snake robot allows it to either hold a fixed position (hover in the water) using the thrusters 6, or to secure itself in a fixed position mechanically. This may be done by wrapping part of the length of the robot around a fixed structure as in FIG. 4, by use of a second tool or by means of specialised attachment links or attachment devices. The use of an attachment mechanism is not shown in the Figures but it will be appreciated that it could be added to the examples shown in the Figures. It may, for example, take the form of a mechanical clamp, a magnetic device, or a suction device, whereby the robot can secure itself to parts of a subsea structure without the need to wrap a length of the robot around the structure. Any suitable attachment method may be used. One particular example uses a suction device that also provides a thrust device function. Such a device can in one mode of use generate a lowered water pressure between itself and a fixed structure to thereby provide suction to secure the robot to the structure, and in another mode of use it can provide thrust by propelling water outward from one side and drawing water inward on the other side, as would be done by the lateral thrust devices of the examples. A combined suction and thrust device may be provided by the addition of a suitable cowling or vane structure to a thrust module 6.

The robot may also be secured to a subsea structure by means of special devices pre-attached to the structure. Such devices on the structure can form all or a part of the attachment means. For example a hook device on the structure could co-operate with a clamp on the robot. Another possibility is for the device on the subsea structure to take an active part in holding the robot, such as clamping device on the subsea structure and arranged to engage with or clasp part of the robot.

This can leave more links of the robot free for use as the manipulator arm for the tool. The robot can act as a manipulator arm with a high degree of freedom of movement, and the ability to apply force using the manipulator tool 14, since both the articulated joint modules 4 and the thrust modules 6 can be used to move and hold the manipulator tool 14.

It will of course be understood that an inspection tool 12, or a manipulator tool 14, or any other type of tool, could be mounted at any point along the robot and not just at the front module 10 or at the stern, although it is anticipated that mounting a tool at the front module 10 or at the stern will be the most useful since it allows for the greatest range of movement and reduces the risk of obstruction of the operation of the tool by the body of the snake robot.

Environments where manipulation tasks of such articulated structures are relevant include narrow locations inside subsea oil and gas installations. Examples of manipulation tasks include:
    Opening and closing valves by using a gripper in the front of the snake robot to grip and turn a valve handle.
    Using a gripper tool mounted in the front of the robot to, for example:
        Guide a cable winch around/through a subsea module that shall be lifted to the surface (for instance in order to replace the module).
        Insert and remove hot stabs.
        Connect/disconnect connectors (e.g., electrical/optical).
        Searching, grasping and recovering objects lost into the subsea template during ROV operations.
        Shackle connection and disconnection.
    Using a hydraulic cutting tool mounted to the head of the robot to cut away a piece of a process pipe in conjunction with the replacement of a subsea process section.

Cleaning the surface of an underwater installation (i.e. removing biological material) by using a brush tool or a nozzle high-pressure water jetting mounted in the front of the robot.

Measuring the vibration of a structure under water by pushing a vibration sensor tool against the structure.

Measuring the integrity of a structure under water by pushing a measurement sensor against the structure. This includes measuring corrosion integrity by pushing a corrosion detection sensor like a CP probe against the structure.

Using a cutter tool mounted on the front of the robot for guide wire cutting.

Using welding tools for repair of the subsea structure.

Using tools for mechanical connections tasks, e.g. plug and unplug.

Using the gripper or similar tool to grab on to a ROV panel handle or a guideline for docking.

Valve operation with a hydraulic torque tool or hydraulic stab-in.

Clamping a sensor onto a process pipe in order to measure wall thickness and other conditional parameters.

Riser inspection: the snake robot may be curled around the riser and then roll up along the riser, or propel itself along the riser, with sensors mounted along the body of the robot in contact with the riser, and enabling sensor data from around and along the whole riser in one operation.

Examples of non-contact inspection tasks (i.e., tasks that do not require physical intervention with subsea equipment) include using a camera mounted in, e.g., the head of the robot to:

Support ROV operations with visual feedback to aid ROV operators in controlling ROV operations. A snake robot would potentially be able to provide video feeds from camera angles not accessible to conventional ROVs.

Check indicators during ROV operations, e.g., by confirming that an ROV has sufficiently secured equipment during installation.

Check for leakages using a sniffer tool

Check for leakages/bubbles using a sound sensor

Perform general inspection: Inspect Christmas trees, manifolds, and protection structures and other subsea template structures. The proposed snake robot will provide access to narrow locations within the subsea template and possibly within Christmas trees and manifolds.

Since the snake robot is a highly articulated structure with many degrees of freedom, different functions can be distributed along the body of the snake. This is for instance relevant during inspection or manipulation tasks when a sensor or tool in front of the robot shall maintain a fixed orientation during motion or follow some specified trajectory. In this case, the backmost modules of the robot can take care of the propulsion of the robot (by undulatory swimming motion and/or using the thrusters); while the joints in the front can ensure that the sensor or tool has the desired orientation or undergoes motion along a desired trajectory.

For swimming snake motion without the use of thrusters, the control algorithms for the joints of the snake robot can to a large extent be based on existing and published control strategies within the snake robot literature, although of course refined and specialised algorithms will be developed. When thrust devices are added then there are two main sources of propulsive forces. In particular, propulsive forces are induced on the robot when it carries out undulatory motion with its body, i.e. when it carries out body wave motion in order to swim like an underwater snake. In addition, propulsive forces are induced by the thrusters mounted along the body. For thrusters based on propellers, linear forces will be created in the direction parallel to the rotation axis of the propeller. For example, the stern propeller unit shown in FIG. 1 will induce forces parallel to the tail section of the snake, while the tunnel thrusters will create forces normal to the body. The stern thruster unit can typically be used to propel the robot over larger distances, while the tunnel thrusters can be used to carry out small sideways or vertical displacements of the robot.

Control strategies for the thrust devices, used alone or in conjunction with undulating motion of the snake robot, can be derived based on known characteristics of existing thrust units and underwater robots with thrust devices and based on known characteristics of existing undulating snake robots. For conventional ROVs and also surface ships with multiple thrusters, the allocation strategy for each thruster in relation to the desired motion of the vehicle represents a fundamental control problem. There is extensive literature on thruster allocation strategies for ROVs, AUVs and surface ships (i.e. stiff bodies with thrusters). For the manipulator arm robot, where thrusters are mounted along a highly articulated structure, the thruster allocation problem takes on a new dimension since the relative position between the thrusters can be changed by the joint angles along the body of the robot. The optimal use of each thruster for one particular body shape of the snake robot will therefore generally change when the robot attains a new body shape. The robot has a control system for controlling the joint modules and the thrust devices in order to move the robot into a required orientation and/or location. The joint modules are used to generate a flexural motion that can propel the robot and/or used to adjust the shape and configuration of the robot. The thrust devices are used to move the robot in translation and/or in rotation.

The control system is arranged to combine the flexural undulation motion of the snake robot with thrust from the thrust devices in order to provide motion that is not possible with a conventional snake robot or a conventional ROV/AUV. The control system can use the joint modules to move the robot into a required configuration and then use the thrust devices to translate and/or rotate the robot in the required configuration to move it to a required location.

The relative location of the joint modules and thrust devices is known and/or can be calculated, and in addition the joint angles are known and/or can be calculated. The control system can hence easily determine the orientation of all of the joint modules and thrust devices, and determine a vector for thrust from each thrust device relative to the centre of mass of the robot. This then allows the control system to calculate required thrust forces and/or joint module adjustments to achieve a required change in orientation and/or location of the robot.

When the underwater manipulator arm robot includes a thrust device for providing longitudinal thrust, as in FIGS. 1 to 4 for example, then the control system can use the longitudinal thrust to propel the robot and use adjustment of the joint modules to adjust the shape of the robot and thereby control the orientation of the robot.

The robot can be powered by an on-board power source such as a battery. This is considered to be sufficient for short duration operations and for inspection operations or light interventions. For longer duration operations or more heavy operations then an outside power source may be required. There are several options for this. The robot may dock at a subsea power station to recharge batteries or recharge another on-board power source. The robot and/or the tool may be tethered. A tether could be permanently attached or temporarily attached, such as during times of high power drain in a subsea operation. A tether can be provided on a subsea template, a nearby ROV/AUV or a tether management system, which might be coupled to a topside support vessel. The energy provided in the tether can also be used to operate more heavy-duty tooling. A tether could provide power in various ways, for example electrical/hydraulic/pneumatic and so on.

The robot might bring the tool to the location for the subsea operation and then connect it to a tether after arriving at the subsea template. Alternatively, the tool might be brought by an ROV or as part of a tether management system (TMS), or the tool can be part of a toolbox permanently located at a subsea template and possibly permanently connected to it.

The robot could be arranged for connection to another similar robot, and this might use the same coupling device as is used for connecting a tool. Several robots joined together could provide energy savings, for example by using a common thruster, under transport, and then this larger snake could be divided into a set of smaller ones for the actual intervention task. A longer snake robot may be preferred for some operations, and a smaller snake robot may be preferred for other operations.

The connection of the robot to the tool may be any suitable mounting device, such as a mechanical device or electromechanical device. As well as supporting the tool on the robot the connection may also provide a coupling for power, for example electrical, hydraulic or pneumatic power, in order to allow for the robot, or a tether attached to the robot, to provide power to the tool.

The robot may be provided with elements having controllable buoyancy. For example, the robot may include ballast tanks that can be filled with pressurised air or alternatively any "bladder" that can be compressed or expanded to change its buoyancy. An element with controllable buoyancy can provide the forces necessary to maintain a constant vertical position without requiring energy consumption except during inflation or deflation. The controlled-buoyancy elements may be incorporated in the lateral thrust modules 6. Advantageously, the buoyancy can be used to provide a slowly varying vertical force to compensate for the weight of the robot and/or for constant vertical currents, whereas the thrust device(s) can provide a rapid corrective force to compensate for rapid changes in forces affecting the robot, for example sudden shifts in currents, or changes arising from changes in shape of the robot. In order to do this, the buoyancy of the controllable-buoyancy elements can be controlled locally as the time integral (i.e. an integral controller) of the vertical component of the local thruster control inputs, so that the average vertical thrust converges to zero under stationary conditions. Controllable-buoyancy elements can be employed to provide positive or negative buoyancy which, when combined with any of the aforementioned methods for direction control, allows the robot to propel itself up and down. This allows for very energy-efficient propulsion over significant distances.

In addition to the advantages mentioned above, there are additional advantages that arise from the shape and size of the snake robot as compared to traditional ROVs and AUVs. The snake robot can approach a target site via a constrained route, for example along a pipe or through a complex installation, in a manner that is not possible with existing ROVs and AUVs due to their size. In addition, where the target site is itself within a confined space or difficult to access then once again the proposed snake robot gives advantages. This means that operations can be carried out in spaces that are not accessible by traditional manipulator arms fixed to ROVs and AUVs and also that operations can be carried out with a reduced degree of dismantling of surrounding structures.

There is set forth herein A1. An underwater manipulator arm robot comprising: a plurality of links that are connected to one another by joint modules for generating a flexural motion of the robot; multiple thrust devices located at different points along the length of the robot for applying thrust to the robot for propulsion and/or guidance; and at least one tool, or at least one connection point for a tool, attached to the robot; wherein the flexural motion and/or thrust devices enable movement of the robot and control of the orientation and/or location of the tool. A2. An underwater manipulator arm robot as set forth in A1, wherein the thrust devices comprise a thrust device for applying lateral thrust and/or a thrust device for applying longitudinal thrust. A3. An underwater manipulator arm robot as set forth in A2 comprising a thrust device for applying lateral thrust, this thrust device being a thrust module with one or more thrusters. A4. An underwater manipulator arm robot as set forth in A3, wherein the thrust module comprises thrusters oriented in two perpendicular directions. A5. An underwater manipulator arm robot as set forth in A1-A4, comprising a thrust device with a controllable direction of thrust. A6. An underwater manipulator arm robot as set forth in A1-A5, comprising a thrust device for applying a longitudinal thrust. A7. An underwater manipulator arm robot as set forth in A1-A6, wherein the thrust devices are capable of moving the robot in translation and/or rotating the robot in roll, pitch and/or yaw. A8. An underwater manipulator arm robot as set forth in A1-A7, wherein the flexural motion generated by the joint modules is an undulating motion capable of propelling the robot. A9. An underwater manipulator arm robot as set forth in A1-A8, wherein the robot comprises at least three links joined by joint modules allowing for articulated motion. A10. An underwater manipulator arm robot as set forth in A1-A9, wherein the joint modules each permit relative rotation in one or more planes. A11. An underwater manipulator arm robot as set forth in A1-A10, wherein the joint modules each permit relative rotation in the yaw, pitch and roll directions of the robot. A12. An underwater manipulator arm robot as set forth in A1-A11, comprising one or more buoyancy element for increasing and/or decreasing the buoyancy of the robot. A13. An underwater manipulator arm robot as set forth in A1-A12, wherein the robot includes a tool or connection point for a tool at the front end of the robot, at a front module, so that the tool is, in use, located at the front end of the robot. A14. An underwater manipulator arm robot as set forth in A1-A13, comprising multiple tools and/or connection points. A15. An underwater manipulator arm robot as set forth in A14, comprising a tool or connection point at the front end of the robot and a tool or connection point at the stern of the robot. A16. An underwater manipulator arm robot as set forth in A1-A15, comprising an inspection tool, for example a camera. A17. An underwater manipulator arm robot as set forth in A1-A16, comprising a manipulator tool. A18. An underwater manipulator arm robot as set forth in A1-A17, comprising a combined suction and thrust device, wherein the combined suction and thrust device uses the same driving mechanism to provide both of a first mode of operation where thrust is provided for propulsion and/or guidance of the vehicle and a second mode of operation where suction is provided for holding the vehicle against another structure. A19. An underwater manipulator arm robot as set forth in A1-A18, wherein the robot is a snake robot. A20. An underwater manipulator arm robot as set forth in A1-A19, wherein the robot comprises a front module with the tool or the connection point for a tool, a stern thrust device at the opposite end of the robot to the front module, multiple links between the front end and stern end, the links coupled by joint modules, and one or more thrust modules along the length of the robot for producing lateral thrust. A21. An underwater manipulator arm robot as set forth in A1-A20, wherein the joint modules are enclosed by oil filled bellows. A22. A method for control of an underwater manipulator arm robot as set forth in A1-A21, the method comprising: controlling the joint modules and the thrust devices in order to move the robot into a required orientation and/or location; wherein the joint modules are used to generate a flexural motion that can propel the robot and/or used to adjust the shape and configuration of the robot; and wherein the thrust devices are used to move all of or parts of the robot in translation and/or in rotation. A23. A method as set forth in A22 comprising: using the joint modules to adjust the robot configuration and using the thrust devices to translate and/or rotate the robot, to move the robot and/or its tool(s) to a required location and/or orientation. A24. A method as set forth in A22 or A23, wherein the robot includes a thrust device for applying a longitudinal thrust and the method comprises: using the longitudinal thrust to propel the robot and using the joint modules to adjust the shape of the robot and thereby control the position and/or orientation of the robot and/or its tool(s). A25. A method as set forth in A22, A23, or A24, comprising determining the orientation of all of the joint modules and thrust devices, determining a vector for thrust from each thrust device, and thereby determining required thrust forces and/or joint module adjustments to achieve a required change in orientation and/or location of the robot and/or its tool(s). A26. A computer program product comprising instructions that when executed on a data processing device will configure the data processing device to control an underwater manipulator arm robot as set forth in any of A1-A21 by means of a method as set forth in any of A22-A25.

The invention claimed is:

1. An underwater snake robot comprising:
   a first end and a second end;
   a plurality of links that are connected to one another in a sequence between the first end and the second end by joint modules for generating a flexural motion of the robot, wherein the joint modules actively drive movement of the links relative to one another and are actuated by one or more actuators and the robot flexes at two or more joints to thereby generate an undulating motion;
   multiple thrust devices located at different points along the length of the robot for applying thrust to the robot for underwater propulsion and optionally for guidance, wherein the multiple thrust devices comprise at least one thruster module in the sequence of links between the first end and the second end of the snake robot; and
   at least one tool, or at least one connection point for a tool, attached to the robot;
   wherein the thrust devices enable movement of the entire robot in translation, the flexural motion and/or thrust devices control the orientation and/or location of the tool with some or all of the links of the robot acting as links of a manipulator arm and wherein the robot is an articulated autonomous underwater vehicle with a single elongate body structure formed by the sequence of links.

2. An underwater snake robot as claimed in claim 1, wherein the thrust devices comprise a thrust device for applying lateral thrust and/or a thrust device for applying longitudinal thrust.

3. An underwater snake robot as claimed in claim 2, comprising a thrust device for applying lateral thrust, this thrust device being a thrust module with one or more thrusters.

4. An underwater snake robot as claimed in claim 3, wherein the thrust module comprises thrusters oriented in two perpendicular directions.

5. An underwater snake robot as claimed in claim 1, comprising a thrust device with a controllable direction of thrust.

6. An underwater snake robot as claimed in claim 1, comprising a thrust device for applying a longitudinal thrust.

7. An underwater snake robot as claimed in claim 1, wherein the thrust devices are capable of moving the robot in translation and/or rotating the robot in roll, pitch and/or yaw.

8. An underwater snake robot as claimed in claim 1, wherein the flexural motion generated by the joint modules is an undulating motion capable of propelling the robot.

9. An underwater snake robot as claimed in claim 1, wherein the robot comprises at least three links joined by joint modules allowing for articulated motion.

10. An underwater snake robot as claimed in claim 1, wherein the joint modules each permit relative rotation in one or more planes.

11. An underwater snake robot as claimed in claim 1, wherein the joint modules each permit relative rotation in the yaw, pitch and roll directions of the robot.

12. An underwater snake robot as claimed in claim 1, comprising one or more buoyancy element for increasing and/or decreasing the buoyancy of the robot.

13. An underwater snake robot as claimed in claim 1, wherein the robot includes a tool or connection point for a tool at the front end of the robot, at a front module, so that the tool is, in use, located at the front end of the robot.

14. An underwater snake robot as claimed in claim 1, comprising multiple tools and/or connection points.

15. An underwater snake robot as claimed in claim 14, comprising a tool or connection point at the front end of the robot and a tool or connection point at the stern of the robot.

16. An underwater snake robot as claimed in claim 1, comprising an inspection tool, for example a camera.

17. An underwater snake robot as claimed in claim 1, comprising a manipulator tool.

18. An underwater snake robot as claimed in claim 1, comprising a combined suction and thrust device, wherein the combined suction and thrust device uses the same driving mechanism to provide both of a first mode of operation where thrust is provided for propulsion and/or guidance of the vehicle and a second mode of operation where suction is provided for holding the vehicle against another structure.

19. An underwater snake robot as claimed in claim 1, wherein the robot is a snake robot.

20. An underwater snake robot as claimed in claim 1, wherein the robot comprises a front module with the tool or the connection point for a tool, a stern thrust device at the opposite end of the robot to the front module, multiple links between the front end and stern end, the links coupled by joint modules, and one or more thrust modules along the length of the robot for producing lateral thrust.

21. An underwater snake robot as claimed in claim 1, wherein the joint modules are enclosed by oil filled bellows.

22. A method for control of an underwater snake robot as claimed in claim 1, the method comprising: controlling the joint modules and the thrust devices in order to move the robot into a required orientation and/or location; wherein the joint modules are used to generate a flexural motion that can propel the robot and/or used to adjust the shape and configuration of the robot; and wherein the thrust devices are used to move all of or parts of the robot in translation and/or in rotation.

23. A method as claimed in claim 22 comprising: using the joint modules to adjust the robot configuration and using the thrust devices to translate and/or rotate the robot, to move the robot and/or its tool(s) to a required location and/or orientation.

24. A method as claimed in claim 22, wherein the robot includes a thrust device for applying a longitudinal thrust and the method comprises: using the longitudinal thrust to propel the robot and using the joint modules to adjust the shape of the robot and thereby control the position and/or orientation of the robot and/or its tool(s).

25. A method as claimed in claim 22, comprising determining the orientation of all of the joint modules and thrust devices, determining a vector for thrust from each thrust device, and thereby determining required thrust forces and/or joint module adjustments to achieve a required change in orientation and/or location of the robot and/or its tool(s).

26. A computer programme product comprising a non-transitory computer readable storage medium readable by a computer and storing instructions that when executed on a data processing device will configure the data processing device to control an underwater snake robot as claimed in claim 1 in order to perform a method comprising:
  controlling joint modules and thrust devices in order to move the robot into a required orientation and/or location;
  wherein the joint modules are used to generate a flexural motion to propel the robot and/or adjust the shape and configuration of the robot; and
  wherein the thrust devices are used to move all of or parts of the robot in translation and/or in rotation.

* * * * *